UNITED STATES PATENT OFFICE.

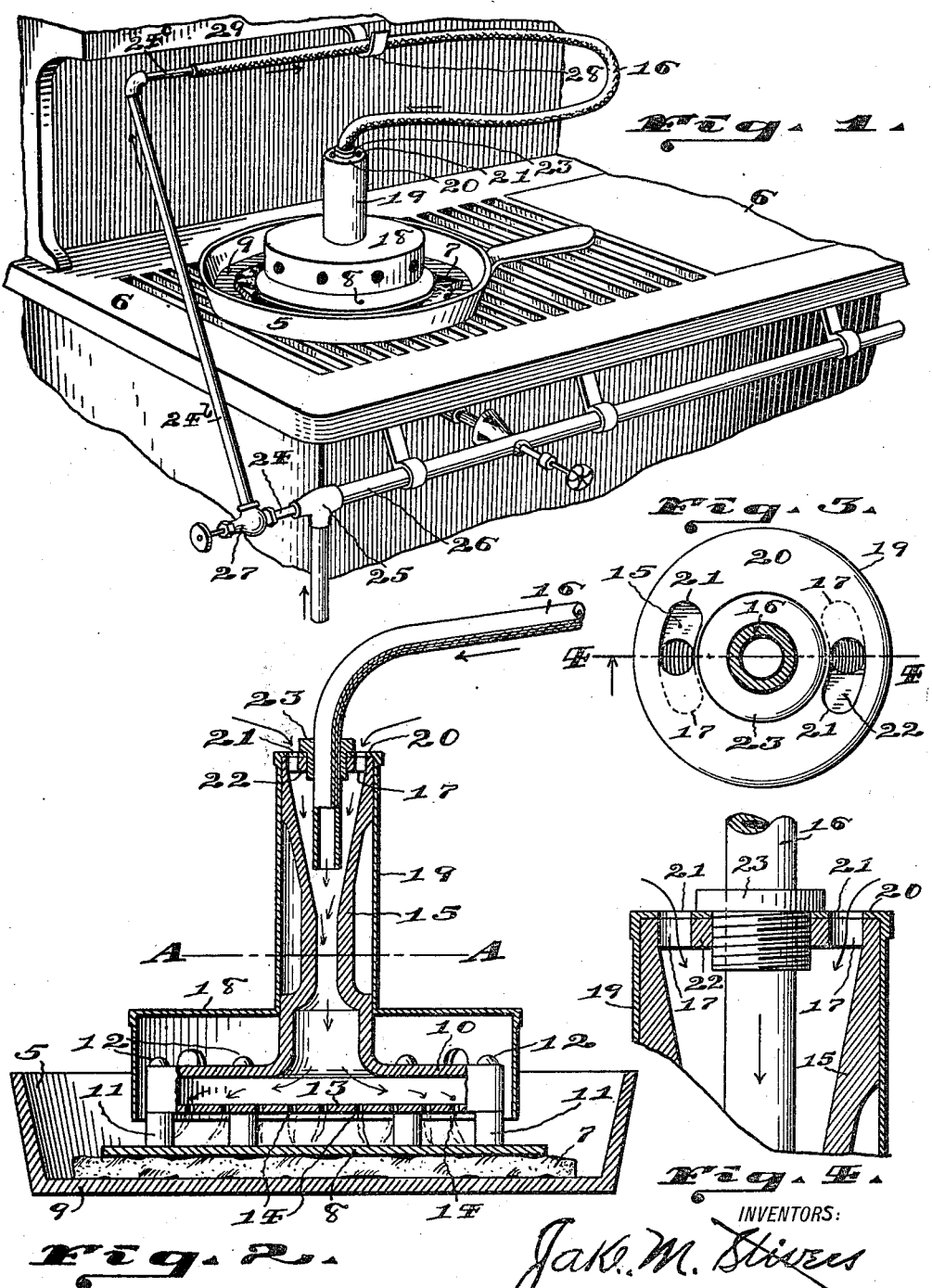

JAKE M. STIVERS AND ANDREW C. ENOCHS, OF OKLAHOMA, OKLAHOMA, ASSIGNORS TO THE RIGHT WAY COOKER COMPANY, OF OKLAHOMA, OKLAHOMA, A CORPORATION OF OKLAHOMA.

FRYING APPARATUS.

1,271,796.  Specification of Letters Patent.  Patented July 9, 1918.

Application filed December 26, 1917. Serial No. 208,771.

*To all whom it may concern:*

Be it known that we, JAKE M. STIVERS and ANDREW C. ENOCHS, citizens of the United States, residing at Oklahoma, in the county of Oklahoma and State of Oklahoma, have invented certain new and useful Improvements in Frying Apparatus, of which the following is a specification, reference being had to the accompanying drawings.

In frying meats, potatoes, pancakes, or mush on one side at a time, much of the flavor is lost and a great deal of time wasted.

The object, therefore, of the invention is to provide means for frying or cooking both sides of the meat, potatoes, or other articles of food at the same time.

Other objects and advantages of the invention will be set forth in the ensuing description.

The drawings show one embodiment of the invention in practical form.

Figure 1 is a perspective view showing the apparatus in use.

Fig. 2 is a sectional view of a portion of the apparatus.

Fig. 3 is an enlarged plan view, with no parts shown below the line A—A of Fig. 2.

Fig. 4 is a sectional view taken on the line 4—4 of Fig. 3, and is substantially an enlarged reproduction of the upper portion of Fig. 2.

Like characters of reference designate like parts in all the figures.

The invention includes means, such, for example, as the common frying-pan 5 heated by and on the common gas range or other stove 6, for frying or cooking the lower side of the meat 7; and in carrying out the objects stated the invention further includes the improved apparatus shown in Figs. 2 to 4, which is arranged to be brought into position to fry the upper side of the meat at the same time the lower side is being fried.

That portion of the apparatus designed to fry the upper side of the meat 7 includes a plate 8, hereinafter referred to as a hot-plate, and this hot-plate is adapted to rest on the upper side of the meat 7 while the latter lies on the bottom 9 of the frying-pan 5.

With the meat 7 fried on its lower side by the bottom 9 of the frying-pan 5 and simultaneously on its upper side by the hot-plate 8, both sides are "sealed" at the same time and the juices and flavor are thus prevented from escaping from one side while the other is being fried.

Any suitable means may be employed to keep the hot-plate 8 at proper frying temperature.

In the present instance the inventors provide a gas burner 10 and mount said burner on short posts 11 which project up integrally from the hot-plate 8, screws 12 being employed to secure said burner to said posts.

The lower wall 13 of the burner 10 is perforated, as at 14, so that the flame from escaping gas is directed downward into the hot-plate 8 as shown in Fig. 2.

Gas is supplied to the burner 10 through a central upwardly-projecting integral tubular mixer 15, which is not materially unlike mixers already used in connection with gas burners.

The gas is fed into the upper end of the mixer 15 by a flexible tube 16, which delivers downward into the conical upper end of said mixer in such manner as to draw in through openings 17 the air required for a fuel mixture.

To hold the heat from the burner 10 down toward the hot-plate 8, a sheet-metal cover 18 is provided, and this cover is supported by an integral dome portion 19 which revolubly embraces and fits the mixer 15.

The upper wall 20 of the dome 19 is provided with inlet openings 21 which are adapted to register with openings 17 in the top wall 22 of the mixer, and by revolving the dome the over-lap of the openings 21 and 17 may be adjusted to control the inlet of air.

The dome 19 is held down in place on the mixer 15 by a bush 23 which is screw-threaded into the top wall 22 of the mixer, and the flexible tube 16 tightly fits this bush for support.

The tube 16 may lead from any suitable source of supply.

In this instance, a pipe 24 leads from the T-joint 25 commonly found in the fuel-supply pipe 26 of a common gas stove; thence upward as at $24^b$; and thence for a short distance across over the stove as at $24^c$; the tube 16 being connected to the pipe extension $25^c$ and leading thence to the mixer 15 as shown.

The pipe 24 is provided with the necessary valve 27, and if necessary for convenience a support 28 may be attached to some portion 29 of the stove to keep the tube 16 from swinging downward too far.

The flexible tube 16 permits the upper or top-frying portion of the apparatus to be moved about over the stove or to be rested on any part of the stove while the meat 7 is being placed into or taken from the frying-pan 5.

The following is claimed:—

1. In apparatus of the class described, a plate, a burner mounted on the plate, a tubular fuel mixer extending upward from the burner, means for supplying fuel to the mixer, a cover for the burner, said cover having a dome portion revolubly embracing the tubular mixer, said mixer and dome having openings adapted to be brought into register.

2. In apparatus of the class described, a plate, a burner mounted on the plate, a tubular fuel mixer extending upward from the burner, a cover for the burner, said cover having a dome portion revolubly embracing the tubular mixer, a bush extending down through the top wall of the dome portion and screwthreaded into the top wall of the mixer, a flexible fuel-supply tube inserted through the bush, the top walls of the dome and mixer having inlet openings adapted to be brought into register by revolving the dome.

Witness our hands this 18 day of December, 1917.

JAKE M. STIVERS.
ANDREW C. ENOCHS.

Copies of this patent may be obtained for five cents each, by addressing the "Commissioner of Patents, Washington, D. C."